United States Patent

[11] 3,545,429

| [72] | Inventors | Edmond R. Pelta<br>71 Sheffield Ave., Pacific Palisades, and<br>Kenneth S. Gold, Canoga Park, California |
|---|---|---|
| [21] | Appl. No. | 627,097 |
| [22] | Filed | March 30, 1967 |
| [45] | Patented | Dec. 8, 1970 |
| [73] | Assignee | Becton, Dickinson and Company<br>Rutherford, New Jersey<br>a corporation of New Jersey, by mesne<br>assignments to |

[54] RESPIRATION MONITOR
5 Claims, 10 Drawing Figs.

[52] U.S. Cl. ................................................. 128/2.1
[51] Int. Cl. .................................................. A61b 5/05
[50] Field of Search .......................................... 128/2.05,
2.06, 2.08, 2.1, 2.15(Digest), 422; 330/110

[56] References Cited
UNITED STATES PATENTS

| 3,109,430 | 11/1963 | Tischler | 128/422 |
|---|---|---|---|
| 3,135,264 | 6/1964 | Tischler et al. | 128/2.05X |
| 3,144,019 | 8/1964 | Haber | 128/2.06 |
| 3,230,358 | 1/1936 | Davis et al. | 330/110X |
| 3,316,902 | 5/1967 | Winchel et al. | 128/2.1UX |
| 3,347,223 | 10/1967 | Pacela | 128/2.1 |
| 3,352,300 | 11/1967 | Rose | 128/2.06 |

*Primary Examiner*—William E. Kamm
*Attorney*—Fulwider, Patton, Rieber, Lee & Utecht ABSTRACT: An impedance pneumograph apparatus for monitoring respiration and detecting apnea, i.e., cessation of respiration. A high frequency carrier signal is impressed on a pair of biopotential electrodes applied to the subject whose respiration is being monitored. The respiration signal representing tidal volume impedance changes in the lungs of the subject modulates the high frequency carrier and is subsequently amplified and demodulated. The demodulated output is used to standardize the high frequency source and derive a direct impedance reading on a galvanometer. The demodulated output is also processed to provide respiration waveform and respiration rate information. Cessation of respiration for a preselected period of time is automatically sensed, and audio and visual alarms are activated to indicate the occurrence of apnea.

INVENTORS
EDMOND R. PELTA
BY KENNETH S. GOLD
Fulwider, Patton, Rieber
Lee & Utecht
ATTORNEY.

3,545,429

RESPIRATION MONITOR

BACKGROUND OF THE INVENTION

This invention relates generally to improvements in respiration-monitoring apparatus and, more particularly, to a new and improved monitoring system of the impedance pneumograph type capable of accurately and reliably monitoring respiration and detecting the occurence of apnea.

It is well known in the bioelectrical arts that there is a reliable correlation between lung volume and transthoracic electrical impedance. An accurate reproduction of instantaneous lung volume can be obtained by continuous measurements of this transthoracic impedance. However, while the basic technique of impedance pneumography to measure this impedance was well known prior to the development of the respiration-monitoring apparatus of the present invention, impedance pneumography has been rather limited in its application and has been largely restricted to use in the research laboratory.

In the impedance pneumograph systems of the prior art, the transthoracic electrical impedance at high frequencies is continuously measured. However, derivation of the respiratory signal with these systems relies upon an anticipated tidal volume change in impedance of approximately 178percent or more, and the systems do not generally perform well for impedance variations significantly less than this 178percent level.

A number of additional problems have been encountered with the impedance pneumographs of the prior art, such as the inability to exclude blood or cardiac artifacts from the respiration signal, the difficulty in reliably limiting the magnitude of the high frequency signal voltage applied to the subject being monitored, and the inability to monitor small tidal volume impedance changes of the order of 0.05 percent such as those encountered with premature infants. Furthermore, there have not been any impedance pneumographs which reliably detect the absence of respiration for preselected periods of time, so that the system can detect apnea and activate appropriate alarm devices. In the latter instance, the highest possible degree of reliability is an absolute must, since apnea which is undetected beyond a rather brief time interval may result in an irreversible physiological effect upon the subject.

In addition to the foregoing problems, impedance pneumograph devices have posed certain electrical shock hazards in some applications. Existing techniques for the derivation of small biopotentials encountered in physiological monitoring frequently utilize an arrangement where the subject is directly coupled to electronic amplifying devices. These are typically vacuum tube or transistor differential amplifiers. Such amplifiers, although designed to have a high common mode rejection, generally require a third neutral or "indifferent" electrode connected to ground potential in order to adequately reject unwanted signals, e.g., 60 cycles. However such a three electrode arrangement inherently poses a potential shock hazard, particularly when the subject is connected to more than one instrument. If any of these instruments have significant leakage current so that a leakage potential can be developed between any one of the instrument electrodes and ground, the subject will receive an electrical shock. The magnitude of the leakage current may or may not reach lethal value, but in any event is dangerous to the subject and cannot be tolerated in medical equipment. In this connection, it is to be noted that the instrument with a leakage path to ground may be quite safe when it is the only instrument connected to the subject, yet the same instrument poses a substantial threat when used in conjunction with other instruments attached to the subject at the the same time.

Hence, those concerned with the development of bioelectrical medical instrumentation have long recognized the need for a new and improved respiration-monitoring system with improved sensitivity, reliability and safety, as well as an instrument capable of detecting apnea. The present invention clearly fulfills the this need.

SUMMARY OF THE INVENTION

Briefly, and in general terms, the present invention involves an impedance pneumograph respiration-monitoring system capable of alarming upon the occurrence of apnea. A high frequency oscillator generates a carrier signal when which is transformer coupled to a pair of biopotential electrodes applied to the subject. Means are provided to limit the maximum high frequency voltage applied to the subject. The respiration signal induced by tidal volume variations in transthoracic impedance modulates the high frequency carrier and is subsequently amplified, demodulated and filtered. The filtered output is fed to a high gain limiting amplifier configuration followed by an adjustable discriminator, Schmitt trigger and pulse generating circuits. The output of the amplifier is the respiration waveform, the output of the pulse generator being directed to an integrator whose output is proportional to respiration rate. The output of the pulse generator is also directed to an adjustable time delay circuit which cooperates with a level detector an alarm system to activate both audio and visual alarms at a preselected time interval following cessation of breathing by the subject.

The use of transformer coupling to the subject, and minimizing of la leakage paths to ground, avoids shock hazards. The use of an adjustable discriminator enables the selective exclusion of unwanted artifacts from the desired respiration signal, and the provision of preselected time delays before apnea alarm avoids frequent alarming due to normal periodic breathing while avoiding a delay which would allow undesirable physiological side reactions to set in. The alarm system is also of a type which will sometimes stimulate breathing in infants when apnea occurs.

The respiration-monitoring system of the present invention is also capable of measuring subject base impedance directly and of indicating electrode malfunction, as well as providing automatic warning of internal circuit failures or power line supply failure.

Hence, the respiration monitor of the present invention provides an extremely sensitive, accurate, reliable and versatile instrument suitable for a wide range of medical applications where respiration monitoring is required, and is particularly well suited to the task of monitoring apnea in premature infants.

DESCRIPTION OF THE PREFERRED EMBODIMENT

Figure 1:
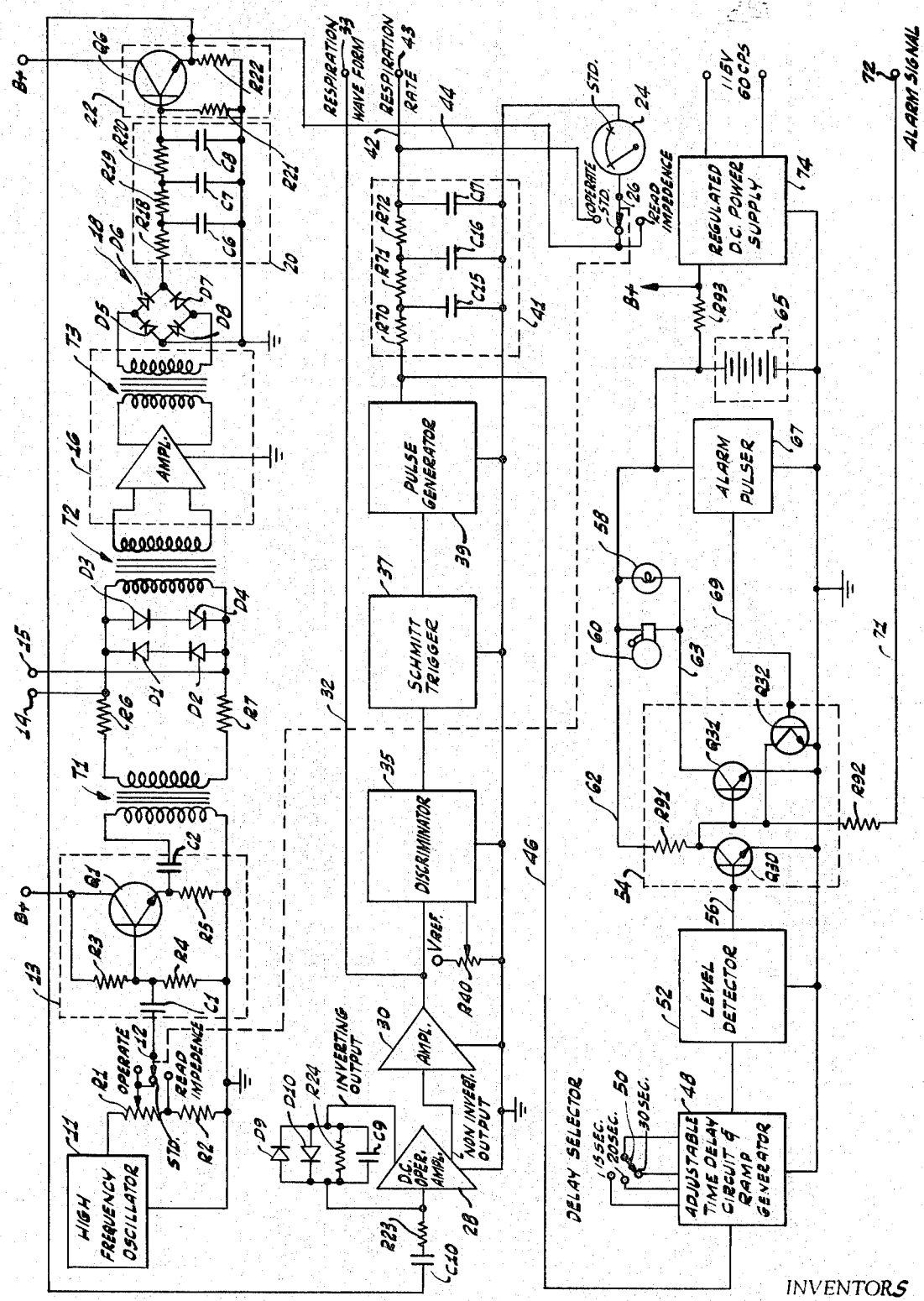
FIG. 1 is a combined block diagram and electrical circuit schematic of a presently preferred embodiment of a respiration monitor in accordance with the present invention.

Referring now to the drawings, and particularly to FIG. 1 thereof, there is shown a respiration-monitoring system capable of detecting apnea and measuring respiration rate and subject base impedance.

A high frequency oscillator 11 provides a 50 kilocycle electrical output as the carrier frequency at which impedance measurements are made. The selection of a frequency of 50 kilocycles is optimum for bioelectrical measurements, since living tissue is not substantially reactive in a physiological sense at frequencies of this order of magnitude.

The electrical output from the oscillator 11 is directed across a pair of series connected resistors R1 and R2, the resistor R2 being fixed in valve, whereas the resistor R1 is a variable potentiometer.

A three position selector switch 12 is connected between the input of an amplifier 13 and selected outputs from the oscillator 11. The three positions of the selector switch 12 are designated "Operate," "Standard," and "Read Impedance," and the switch can be selectively set to each of these positions for the instrument functions of normal operation, standardization, and direct reading of subject base impedance, respectively, in the manner and for the reasons hereinafter set forth in connection with other portions of the monitoring system.

The constant voltage output from the high frequency oscillator 11 is fed as input to the amplifier 13 which is a conventional emitter-follower having low impedance output. The capacitors C1 and C2 are conventional input and output capacitors for the amplifier 13, and resistors R3, R4 and R5 provide a conventional biasing arrangement for the transistor Q1.

The emitter-follower amplifier 13 drives the primary winding of a transformer T1, the secondary winding of which forms part of the subject circuit, the subject (not shown) being located between a pair of biopotential electrodes 14 and 15 applied to the chest of the subject. The biopotential electrodes 14, 15 may take any appropriate form well known in the art, such as silver discs in an appropriate housing or electrodes of the silver-silver chloride type.

A pair of resistors R6 and R7 are connected in series with the electrodes 14, 15 and the subject to limit maximum current flow. In addition, the resistors R6 and R7 cooperate with two back to back connected pairs of diodes D1, D2 and D3, D4 which limit the maximum voltage across the subject and the electrodes to the forward conduction voltage drop across two diodes, typically of the order of 1.5 volts for a pair of silicon diodes. Of course, it will be appreciated by those or of ordinary skill in the art that any m number of diodes can be used in accordance with the magnitude of the limiting potential desired. In practice, subject voltage rarely exceeds 0.4 volts peak which is well below physiological sensitivity level.

The voltage appearing across the subject between the biopotential electrodes 14, 15 varies as the subject breathes because of the tidal volume changes in transthoracic electrical impedance. Hence, the carrier wave is modulated by these tidal volume impedance changes.

The voltage across the subject and the biopotential electrodes 14, 15 also appears across the primary winding of a transformer T2, the secondary winding of the transformer T2 providing electrical input to a carrier amplifier 16 having a high input impedance.

It will be apparent from FIG. 1, that there are no direct electrical connections between the subject and either of the oscillator 11 or amplifiers 13 and 16. In this connection, both of the transformers T1 and T2 are designed for every low leakage by keeping the interwinding capacity 11 of the transformers to a minimum. Hence, the stray leakage current to ground at power frequencies is very small and the subject is thoroughly isolated form auxiliary electrical circuits and from ground.

The subject voltage, i.e., the voltage across the biopotential electrodes 14, 15 and the primary winding of the transformer T2, is coupled to the input of the carrier amplifier 16. The carrier amplifier 16 typically has a gain of 25 and is provided with an output transformer T3 which couples the amplifier output to a demodulator 18.

Figure 2:
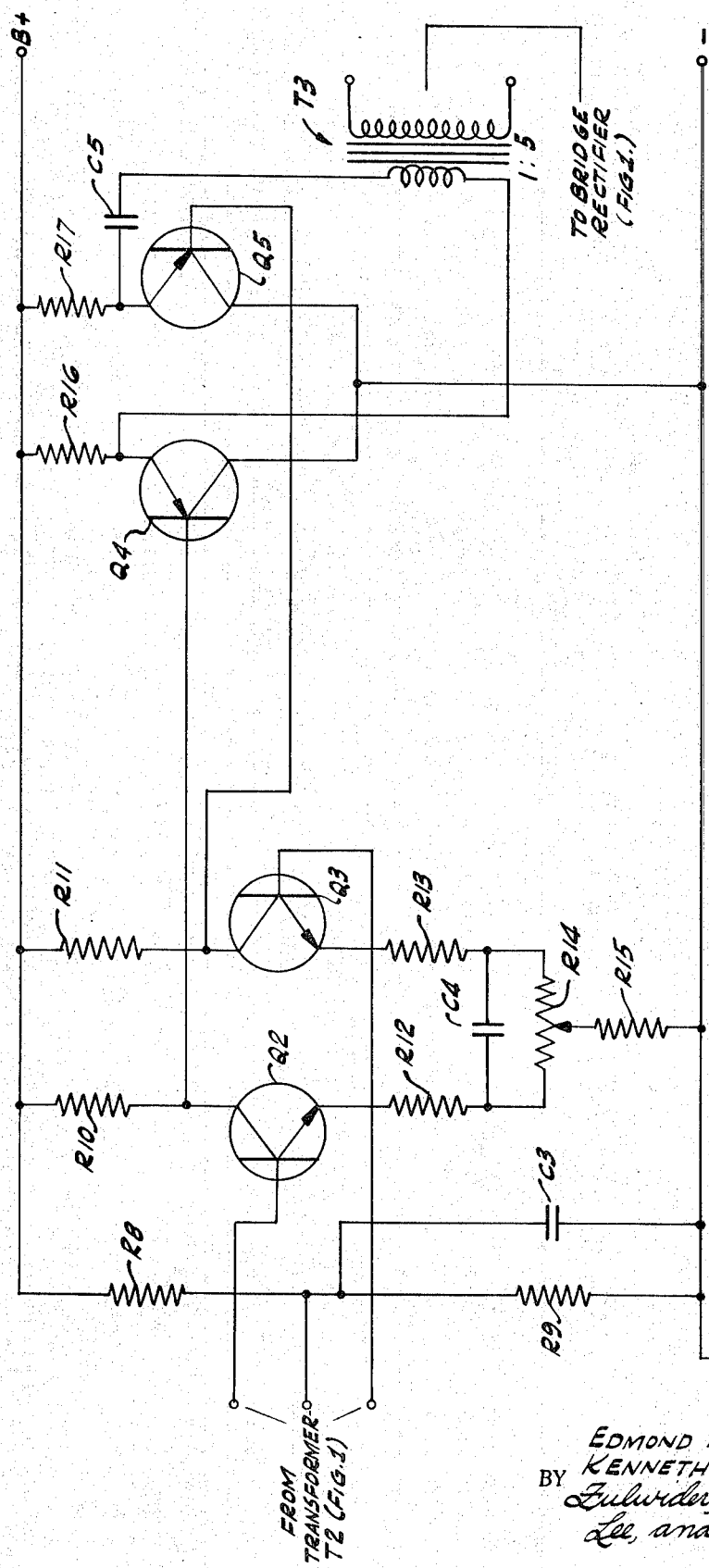
FIG. 2 is an electrical schematic diagram of a carrier amplifier circuit for use with the respiration-monitoring system of FIG. 1.

One embodiment of electrical circuitry suitable for carrying out the necessary functions of the carrier amplifier 16 is illustrated in FIG. 2 of the drawings. In the carrier amplifier circuit shown in FIG. 2, it is necessary to provide a center-tapped secondary winding for the transformer T2 of FIG. 1, in view of the push-pull input required by the transistors Q2 and Q3. Typical component types and values for the carrier amplifier circuit of FIG. 2 are as follows:

R8—27 kilohms.
R9—12 Kilohms.
R10, R11—4.7 kilohms.
R12, R13—150 ohms.
R14—500 ohm potentiometer.
R15—18 kilohms.
R16, R17—1 kilohm.
C3—16 microfarads.
C4—0.1 microfarads.
C5—0.47 microfarads.
Q2, Q3—Type 2N3565 transistors (manufactured by Fairchild Semiconductor Inc., San Rafael, California).
Q4, Q5—Type 2N3645 transistors (Fairchild Semiconductor Inc.).

The output transformer T3 converts the double ended output of transistors Q4 and Q5 to single ended output, and the 1—5 step-up ratio of the transformer T3 provides a high voltage drive for the demodulator 18 to obtain maximum output and linearity.

The demodulator 18 in FIG. 1 is comprised of four rectifiers D5, D6, D7 and D8 connected in a conventional full-wave bridge rectifier circuit configuration.

The input to the demodulator 18 is the amplified carrier wave bearing the respiration signal, and the output of the demodulator is directed to a filter network 20 to remove carrier frequency components and stray power frequency noise in the demodulator output.

The filter network 20 includes resistors R18, R19, R20 and capacitors C6, C7, C8 connected to provide three sections of conventional R—C ripple filtering. The multiple section filter network 20 typically provides complete rejection of unwanted signals above 3 cycles per second.

The output of the filter network 20 is directed to a buffer amplifier 22 comprising transistor Q6 and resistors R21 and R22 connected in a conventional emitter-follower circuit configuration.

The DC output from the filter network 20 and amplifier 22 is proportional to the voltage across the subject, and this voltage is maintained constant by standardizing the output of the high frequency oscillator 11.

The standardization procedure requires adjustment of the oscillator 11 by means of the potentiometer R1, to obtain a standard deflection on the scale of a galvanometer 24 when the galvanometer is connected through a three position selector switch 26 to the output of the emitter-follower amplifier 22.

The selector switch 26 is ganged to the selector switch 12 at the output of the oscillator 11, and the three positions of the switch 26 correspond to the three positions of the switch 12. With the switches 12 and 26 in their "Standard" positions (as shown in FIG. 1), the voltage across the subject can be standardized.

With the switches 12 and 26 in their "Read Impedance" positions, the output of the oscillator 11 is reduced to a known value corresponding to the voltage appearing across the resistor R2, and the resultant lower scale reading on the meter 24 represents the base impedance of the subject.

With the switches 12 and 26 in their "Operate" positions, standard voltage is applied to the subject, and the meter 24 reads respiration rate information, in a manner to be subsequently described, by virtue of connection to the integrated output of a pulse generator providing a train of pulses at the frequency of respiration of the subject.

The electrical output from the amplifier 22 is a relatively low level respiration signal which is further amplified by a stable DC operational amplifier 28 with a typical midband gain of approximately 60 determined by resistors R23 and R24 having typical values of 5.6 Kilohms and 330 Kilohms, respectively. A high cutoff frequency of approximately 5 cps. is established for amplifier 28 by capacitor C9 (typically 0.1 microfarad) in the feedback path around the amplifier, and a low cutoff frequency of approximately 0.25 cps. is established by capacitor C10 (typically 80 microfarads). This frequency band contains essentially all of the relevant respiration information desired.

A pair of back to back connected diodes D9 and D10 are provided in the feedback path around the amplifier 28 in order to prevent saturation and recovery delay in the amplifier. This precaution is necessary from a physiological standpoint, since it enables the amplifier 28 to provide high gain for low signal levels and yet accommodate much higher signal levels without undue saturation. Such an arrangement is ideally suited for the monitoring of apnea conditions, especially in premature infants where waveform variations as small as 0.05 percent amplitude modulation of the carrier (representing as little as 0.1 ohms tidal volume impedance changes) must be reliably detected, yet substantially larger signals may be encountered.

Figure 3:
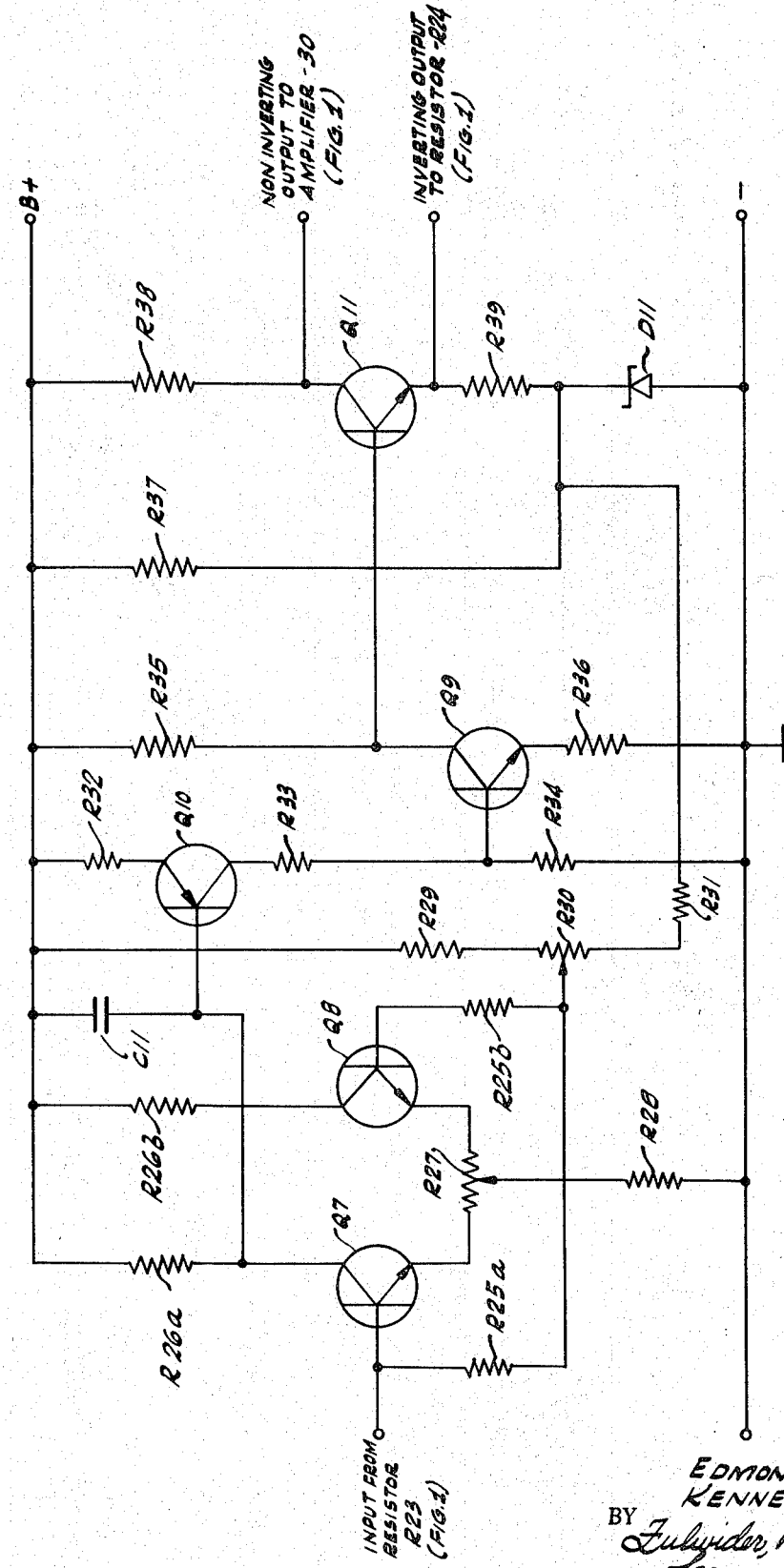
FIG. 3 is an electrical schematic diagram of a DC operational amplifier circuit for use with the respiration-monitoring system of FIG. 1.

One embodiment of electrical circuitry suitable for carrying out the necessary functions of the DC operational amplifier 28 is illustrated in FIG. 3 of the drawings, and typical component types and values are as follows:

R25a, R25b—22 kilohms.
R26a, R26b—5.6 kilohms.
R27—500 ohm potentiometer.
R28—27 kilohms.
R29—10 kilohms.
R30—500 ohm potentiometer.
R31—120 ohms.
R32—56 ohms.
R33—2.2 kilohms.
R34, R35—10 kilohms.
R36—100 ohms.
R37—3.3 kilohms.
R38, R39—560 ohms.
C11—1 microfarad.
D11—5.6 volt Zener diode, type 1N4734 (manufactured by Motorola Semiconductor Products, Inc. of Phoenix, Arizona).
Q7, Q8, Q9—Type 2N3565 transistor (Fairchild Semiconductor, Inc.).
Q10—Type 2N3645 transistor (Fairchild).
Q11—Type 2N3643 transistor (Fairchild).

The electrical output of the operational amplifier 28 in FIG. 1 is direct coupled to a conventional single stage low frequency amplifier 30 with a gain of approximately ten. The output of the amplifier 30 is a high level respiration waveform which is made available for external instruments, such as recorders and the like, over line 32 to output terminal 33.

The respiration signal from the amplifier 30 is also directed as electrical input to a discriminator 35 which is provided with an adjustable threshold. The threshold level is varied by adjustment of a potentiometer R40 connected between ground and a maximum reference potential of VREF = 5 volts. By adjusting the threshold, a discriminator triggering level can be set for any desired depth of breathing of the subject whose respiration is being monitored. The range of adjustment corresponds to a peak to peak ohmic respiration signal, at the subject, of between 0.1 ohms and 1.0 ohms. This range has been empirically determined to be optimum for most subjects encountered. The discriminator is adjusted to eliminate low level blood or cardiac artifacts which might otherwise cause the monitoring system to indicate respiration when, in effect, an apnea episode has actually occurred.

Figure 4:
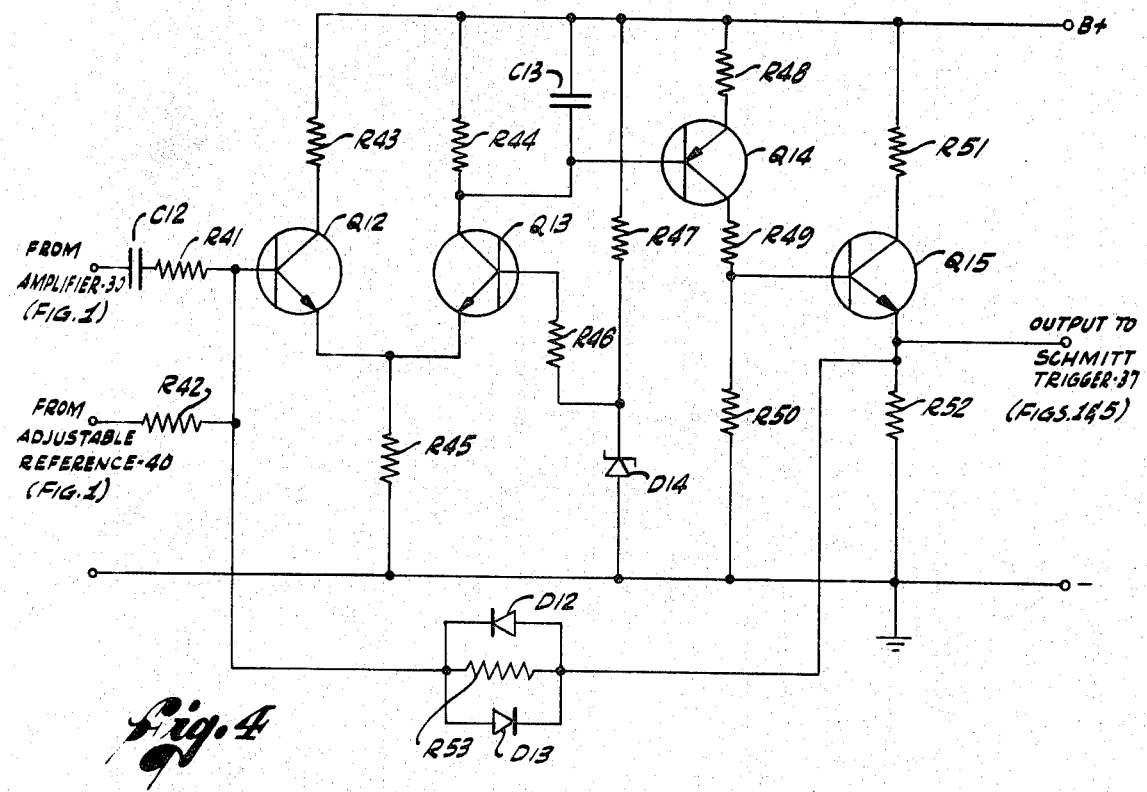
FIG. 4 is an electrical schematic diagram of a discriminator circuit for use with the respiration-monitoring system of FIG. 1.

One embodiment of electrical circuitry suitable for carrying out the necessary functions of the adjustable discriminator 35 is illustrated in FIG. 4 of the drawings, and typical components and values are as follows:

R41—4.7 kilohms.
R42—22 kilohms.
R43, R44—5.6 kilohms.
R45—2.2 kilohms.
R46—4.7 kilohms.
R47—3.3 kilohms.
R48—56 ohms.
R49—2.2 kilohms.
R50—10 kilohms.
R51—3.3 kilohms.
R52—1.5 kilohms.
R53—100 kilohms.
D12, D13—Type 1N914 diodes (Continental Device Corp., Hawthorne, Calif.).
D14—Type 1N4734 Zener diode (Motorola).
Q12, Q13—Type 2N3565 transistors (Fairchild).
Q14—Type 2N3645 transistor (Fairchild).
Q15—Type 2N3643 (Fairchild).

The quiescent output level of the discriminator 35 is approximately 5.6 volts.

Figure 5:
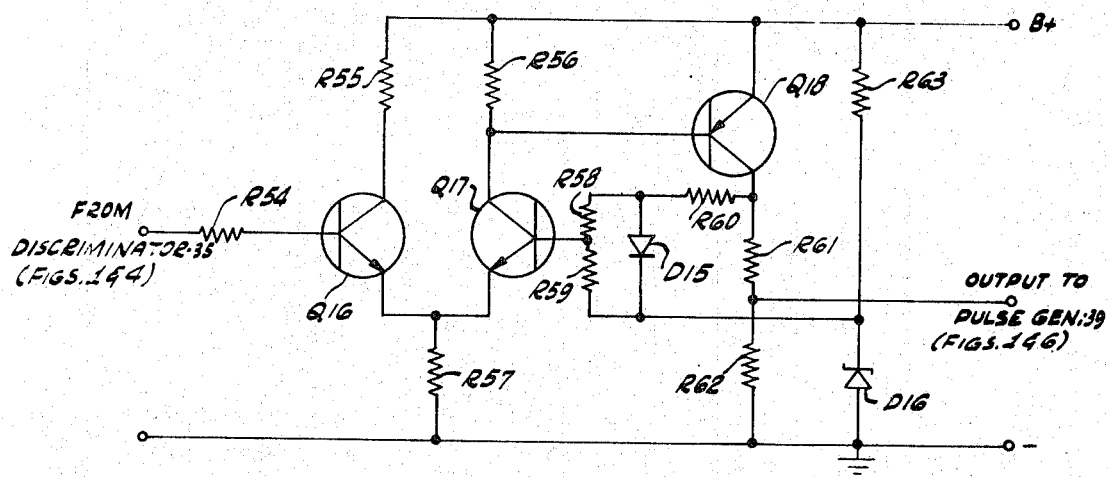
FIG. 5 is an electrical schematic diagram of a Schmitt trigger circuit for use with the respiration-monitoring system of FIG. 1.

The electrical output of the discriminator 35 in FIG. 1 consists of clipped respiration pulses which are directed as input to a Schmitt trigger circuit 37. The Schmitt trigger 37 improves the shape of the clipped respiration pulses by converting the waveform to a square wave format. A suitable embodiment of a Schmitt trigger circuit is illustrated in FIG. 5 of the drawings, and typical component types and values are as follows:

R54—5.6 kilohms.
R55, R56—2.7 kilohms.
R57—10 kilohms.
R58—18 kilohms.
R59—10 kilohms.
R60—220 kilohms.
R61—22 kilohms.
R62—2.2 kilohms.
R63—3.3 kilohms.
D15—Type 1N914 diode (Continental Device Corp.)
D16—Type 1N4734 Zener diode (Motorola).
Q16, 17—Type 2N3565 transistors (Fairchild).
Q18—Type 2N3645 transistor (Fairchild).

The electrical output of the Schmitt trigger 37 in FIG. 1 is directed as input to a pulse generator 39 to trigger the latter so that it produces a square wave pulse train. The pulse generator 39 generates a single square output pulse of constant width for every trigger pulse supplied from the schmitt trigger 37.

Figure 6:
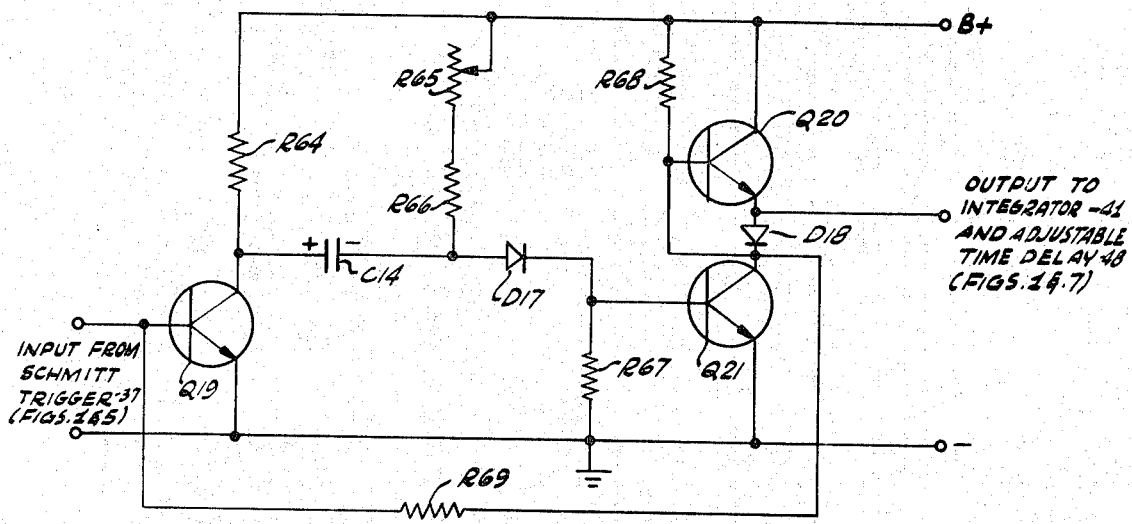
FIG. 6 is a electrical schematic diagram of a pulse generator circuit for use with the respiration-monitoring system of FIG. 1.

One embodiment of electrical circuitry suitable for carrying out the pulse generating functions of the generator 39 is illustrated in FIG. 6 of the drawings, and typical component types and values are as follows:

R64—4.7 kilohms.
R65—10 kilohm potentiometer.
R66—18 kilohms.
R67—3.3 kilohms.
R68—2.7 kilohms.
R69—22 kilohms.
C14—16 microfarads.
D17, D18—Type 1N914 diodes (Continental Device Corp.).
Q19, Q20, Q21—Type 2N3643 (Fairchild).

The pulse train output from the pulse generator 39 in FIG. 1 is fed to an integrator 41. The integrator 41 comprises resistors R70, R71, R72 and capacitors C15, C16, C17 connected to provide three stages of conventional R—C integration. The DC output from the integrator 41 is directly proportional to pulse repetition frequency and, hence, respiration rate. The latter respiration rate output information is directed over line 42 to output terminal 43 and is also directed over line 44 to the "Operate" terminal of the selector switch 26. Thus, when the switch 26 is in the "Operate" position, the deflection of the meter 24 indicates respiration rate on an appropriate scale.

The pulse train output from the pulse generator 39 is also directed over line 46 to an adjustable time delay and ramp generator circuit 48. The ramp generator is initiated immediately upon the loss of a pulse, and reset does not occur until the arrival of another pulse. The slope of the ramp function is determined by the delay period selected by the operator by means of a selector switch 50. When the ramp potential exceeds a fixed internal reference potential, a level detector 52 changes state and activates an alarm gate 54. The selector switch 50 enables operator selection of apnea warning periods of between 15 and 30 seconds. Alarm periods of less than 15 seconds would result in frequent alarming due to normal periodic breathing, such periodic breathing being particularly common in premature infants. On the other hand, an alarm period which exceeds 30 seconds may prove harmful, since it becomes more difficult to stimulate respiration in premature infants after a 30—45 second pause.

Figure 7:
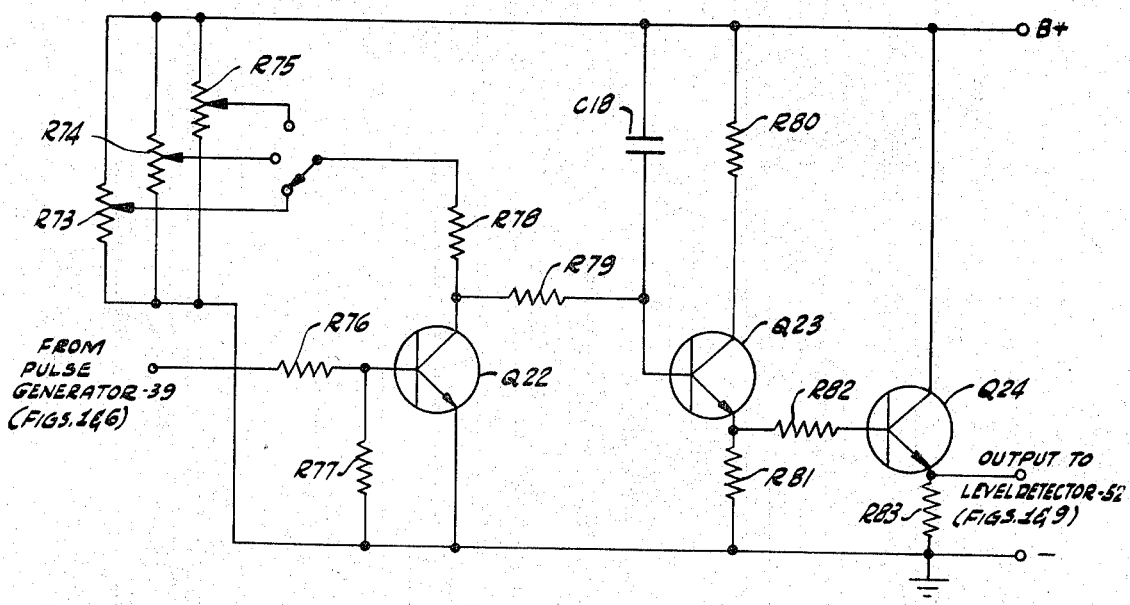
FIG. 7 is an electrical schematic diagram of a time delay and ramp generator circuit for use with the respiration-monitoring system shown in FIG. 1.

One embodiment of electrical circuitry suitable for carrying out the necessary functions of the time delay and ramp generator circuit 48 is illustrated in FIG. 7 of the drawings, and typical components and values are as follows:

R73, R74, R75—10 kilohms.
R76—47 kilohms.
R77—10 kilohms.
R78—3.9 megohms.
R79—3.3 kilohms.
R80—10 kilohms.
R81—100 kilohms.
R83—10 kilohms.
C18—8 microfarads.
Q22, Q23, Q24—Type 2N3565 transistors (Fairchild).

The electrical output of the ramp generator is clamped at a low level as long as pulses are received from the pulse generator 39, clamping being accomplished by means of the transistor switch Q22 in FIG. 7. If the respiration pulse train ceases, the transistor switch Q22 remains open, and the ramp generator output increases towards its limiting or reference potential selected by the switch 50. The electrical output from the time delay circuit and ramp generator 48 is compared with another reference potential ($V_R$ in FIG. 9) in the level detector 52.

Figure 8A:
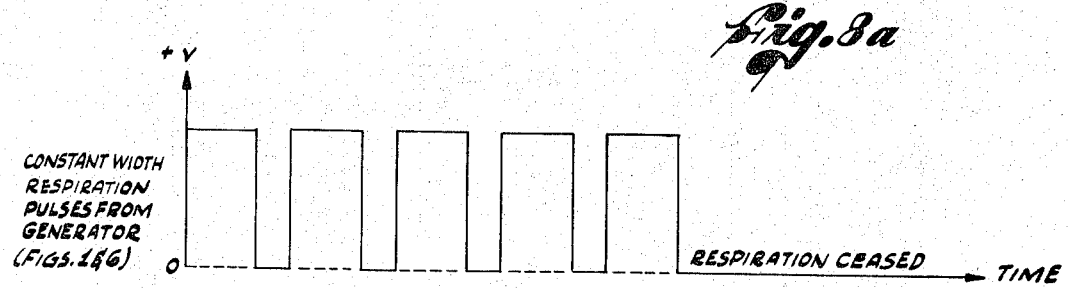
FIGS. 8a and 8b illustrate typical input and output waveforms for the electrical circuit of FIG. 7.
Figure 8B:
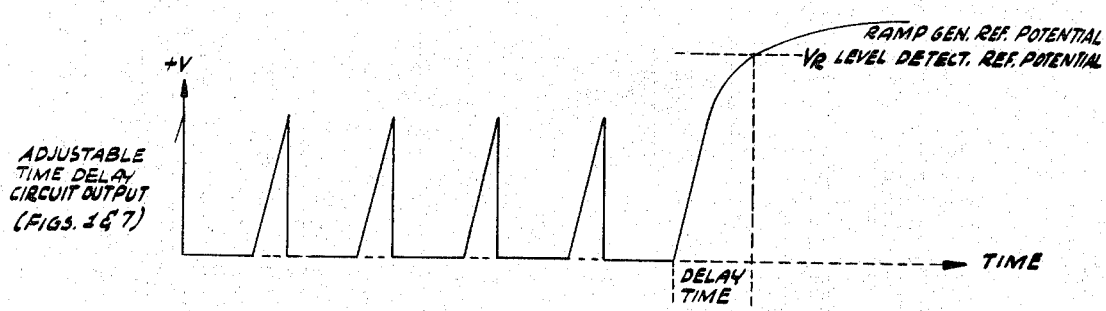

As long as respiration pulses are generated, the clamped ramp waveform falls substantially below the level detector reference potential $V_R$. In the absence of respiration pulses, the ramp function increases to a level above $V_R$, the time necessary to exceed the reference level being dependent upon the delay period selected by the switch 50. Fig FIGS. 8a and 8b illustrate the input and output waveforms, respectively, for the time delay and ramp generator circuit 48, the waveforms of FIGS. 8a and 8b having a common time base scale. FIG. 8a illustrates the input respiration pulses generated by the pulse generator 39. In FIG. 8b, it will be observed that the ramp function cannot rise to the reference level $V_R$ in the brief interval between respiration pulses. However, when respiration ceases, the ramp function rises above the $V_R$ level. When the ramp function increases above the $V_R$ level, the level detector changes state and provides a zero DC output level for the alarm gate 54.

Figure 9:
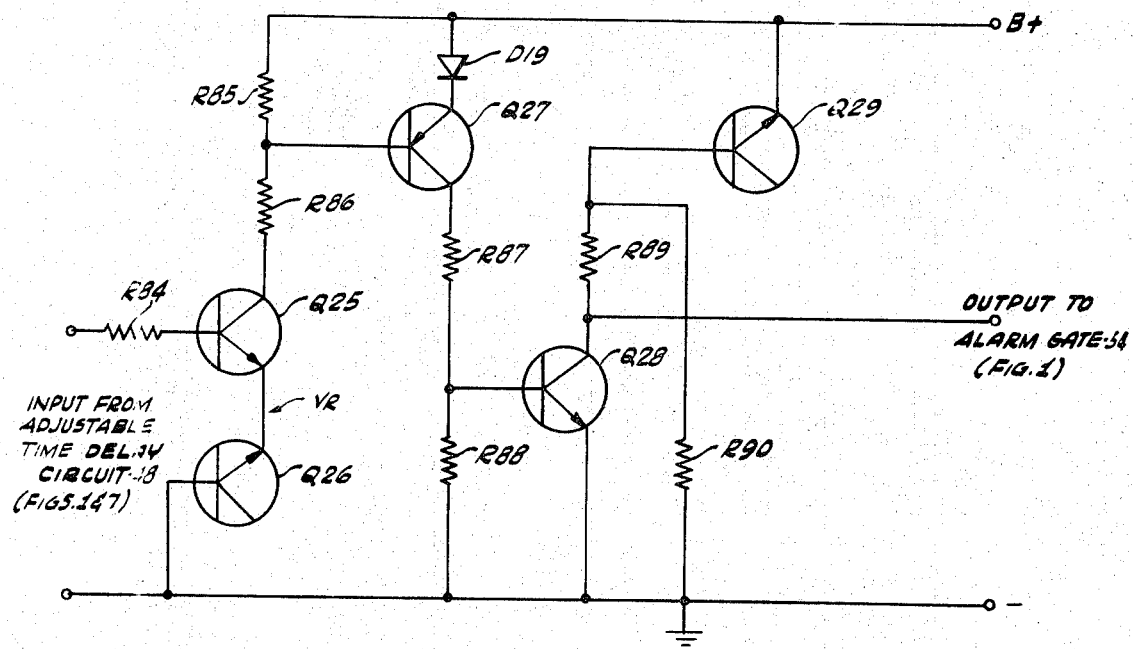
FIG. 9 is an electrical schematic diagram of a level detector circuit for use with the respiration-monitoring system of FIG. 1.

One embodiment of electrical circuitry suitable for carrying out the necessary functions of the level detector 52 is illustrated in FIG. 9 of the drawings, and typical components and values are as follows:

R84—2.2 kilohms.
R85—5.6 kilohms.
R86—10 kilohms.
R87—15 kilohms.
R88—2.2 kilohms.
R89—22 kilohms.
R90—10 kilohms.
D19—Type 1N914 diode (Continental Device Corp.).
Q25, Q28—Type 2N3565 transistors (Fairchild).
Q26, Q29—Type 2N3643 transistors (Fairchild).

The level detector reference potential $V_R$ is established by the transistor Q26.

The alarm gate 54 is held off at its primary input over line 56 by the output of the level detector 52 in its normal state, i.e., a positive DC level so long as respiration pulses are being produced by the pulse generator 39. If the output of the level detector 52 drops to zero, a preselected period of time after apnea has occurred, the alarm gate 54 is opened, and the alarm light 58 and alarm sounder 60 are activated. The light 58 and sounder 60 are connected in parallel across lines 62 and 63 from the alarm gate 54.

Suitable circuitry for the alarm gate 54 is illustrated in FIG. 1, and typical component types and values are:

R91—1.8 kilohms.
R92—10 kilohms.
Q30, Q32—Type 2N3565 transistors (Fairchild).
Q31—Type 2N3643 transistor (Fairchild).

A rechargable battery 65 (typically 6 volts) supplies the DC power for the alarm gate 54, as well as for the alarm light 58 and the sounder 60. Intermittent operation of the light 58 and sounder 60 is accomplished by means of an alarm pulser 67 which grounds the secondary alarm gate input over line 69 at a repetition rate of approximately 100 pulses per minute.

The alarm pulser 67 comprises a conventional astable flip-flop which is powered to run continually by the battery 65. A 100 pulse per minute signal has been empirically found to have the desirable advantage of sometimes stimulating premature infants to start breathing again after the occurrence of apnea. Moreover, an intermittent warning signal also has the desirable effect of attracting attention more readily.

The 100 pulse per minute signal indicating an alarm condition is also supplied through current limiting resistor R92 over line 71 to an output terminal 72 for external monitoring purposes. In alarm condition, the magnitude of the electrical potential appearing at terminal 72 is approximately 0.6 volts peak, whereas normal conditions provide an output potential of approximately 0.1 volts peak.

The battery 65 is maintained in a charged state by trickle charging from a regulated DC power supply 74 through a resistor R93. The DC power supply 74 is of conventional design and supplies 24 volts DC as the B+ output to all circuits other than those powered by the battery 65.

It will be apparent that, in addition to an apnea episode, any defect in the circuitry of the respiration monitor which causes the output of the level detector 52 to drop to zero will initiate an alarm condition. Hence, the operator is immediately apprised of the existence of a defect in the instrument and can take whatever remedial steps are necessary. Such defects include loss of supply voltage, either because of inadvertent detachment of the line cord or failure of the regulated power supply 74, since the level detector 52 is operated from the latter power supply and will revert to the zero output alarm condition upon loss of power.

The respiration monitor of the present invention satisfies a long existing need in the medical arts for an extremely sensitive, accurate, versatile, reliable and safe instrument capable of monitoring respiration, measuring subject base impedance, and alarming upon the occurrence of apnea.

We claim:

1. A respiration-monitoring apparatus, comprising:

a source of high frequency voltage;

first transformer means for coupling at least a portion of said voltage from said high frequency source to a subject to be monitored, said first transformer means having sufficiently low leakage capacitance to ground as to pose substantially no electrical shock hazard to said subject;

diode limiting means for limiting the maximum voltage applied to said subject;

amplifier means having a high input impedance;

second transformer means for coupling the voltage across said subject to the input of said amplifier means, said second transformer means also having sufficiently low leakage capacitance to ground as to pose substantially no electrical shock hazard to said subject;

a demodulator;

third transformer means for coupling the output of said amplifier means to said demodulator;

filter means to derive a respiratory signal from the output of said demodulator;

a buffer amplifier connected to receive the output of said filter means;

a DC operational amplifier having high gain for low level respiration signals, said operational amplifier being connected to receive the electrical output of said buffer amplifier;

means connected to said operational amplifier to minimize saturation and recovery delay in said operational amplifier at higher signal levels;

discriminator means having an adjustable threshold to receive the amplified output from said operational amplifier and to provide a modified signal output substantially devoid of undesired physiological artifacts;

wave-shaping means to improve the waveform of the electrical output from said discriminator means;

pulse generator means connected to receive the output of said wave-shaping means for generating a pulse train of uniform width pulses;

integrator means for integrating the electrical output from said pulse generator means;

a galvanometer;

switching means for selectively connecting said galvanometer to the output of said integrator means or the output of said buffer amplifier to indicate respiration rate or subject base impedance, respectively;

sensing means connected to receive the electrical output of said pulse generator means, said sensing means being responsive to a lack of a pulse to establish an alarm condition after a preselected time period following loss of a pulse;

means for varying the duration of said preselected time period; and alarm means for generating a warning signal upon said sensing means establishing said alarm condition.

2. Respiration-monitoring apparatus as set forth in claim 1, and further comprising:

means for standardizing the output voltage from said source of high frequency voltage.

3. Physiological-monitoring apparatus as set forth in claim 1, wherein said warning signal generated by said alarm means is an intermittent signal.

4. Respiration-monitoring apparatus as set forth in claim 1, and further comprising:

a first source of electrical power for said alarm means; and a second source of electrical power for all electrical circuitry in said monitoring apparatus other than said alarm means.

5. Respiration-monitoring apparatus as set forth in claim 4, and further comprising:

means for charging said first source of electrical power from said second source of electrical power.